(12) United States Patent
Connors

(10) Patent No.: US 11,732,741 B2
(45) Date of Patent: Aug. 22, 2023

(54) RATCHET TOGGLE CONNECTOR

(71) Applicant: 1552818 Ontario Limited, London (CA)

(72) Inventor: Geoff Weyman Connors, London (CA)

(73) Assignee: 1552818 Ontario Limited, London (CA)

( * ) Notice: Subject to any disclaimer, the term of this patent is extended or adjusted under 35 U.S.C. 154(b) by 631 days.

(21) Appl. No.: 16/719,444

(22) Filed: Dec. 18, 2019

(65) Prior Publication Data
US 2020/0124076 A1 Apr. 23, 2020

(51) Int. Cl.
*E01B 9/12* (2006.01)
*F16B 21/18* (2006.01)
*F16B 13/08* (2006.01)

(52) U.S. Cl.
CPC ........ *F16B 21/186* (2013.01); *F16B 13/0808* (2013.01)

(58) Field of Classification Search
CPC ... F16B 13/0825; F16B 13/08; F16B 13/0808
USPC ..... 411/502, 508; 292/307 A, 323, 325–327, 292/340, 344, 346; 24/16 PB
See application file for complete search history.

(56) References Cited

U.S. PATENT DOCUMENTS

| | | | | |
|---|---|---|---|---|
| 4,075,924 A * | 2/1978 | McSherry | ............... | F16B 37/04 411/965 |
| 4,286,497 A * | 9/1981 | Shamah | ............. | F16B 13/0808 411/345 |
| 4,573,844 A * | 3/1986 | Smith | ................... | F16B 21/073 24/453 |
| 4,657,461 A * | 4/1987 | Smith | ................. | F16B 13/0808 24/453 |
| 4,865,501 A * | 9/1989 | Ferris | .................. | F16B 13/0808 24/453 |
| 6,161,999 A * | 12/2000 | Kaye | .................... | F16B 13/0808 411/344 |
| 6,347,435 B1 * | 2/2002 | Davignon | .......... | B65D 63/1063 411/338 |
| 6,789,341 B1 * | 9/2004 | Badura | .................. | F41A 17/44 42/70.11 |
| 7,934,297 B2 * | 5/2011 | Williams | ........... | B65D 63/1072 292/307 A |
| 8,282,047 B2 * | 10/2012 | Franks | .................... | F16L 3/233 248/71 |
| 8,443,493 B2 * | 5/2013 | Seidel | .................. | F16B 5/0628 411/509 |

(Continued)

*Primary Examiner* — Gary W Estremsky
(74) *Attorney, Agent, or Firm* — Borden Ladner Gervais LLP; Jason R. Mueller-Neuhaus

(57) ABSTRACT

A ratchet toggle connector for fastening together two or more workpieces. The fastener includes an anchor ribbon and a retaining cap. The anchor ribbon includes an extended ribbon with an integrated gear rack, and an integral anchor with a pair of bendable tapered wings. The retaining cap houses a pawl and a slot sized and shaped to receive a free end of the extended ribbon. In use, the gear rack and pawl engage to resist retraction of the retaining cap when the extended ribbon is received in the slot, and the wings are configured to bend toward the extended ribbon to a collapsed state for passage of the anchor through an opening in a workpiece and to rebound to an expanded state following passage of the anchor through the opening, to prevent retraction of the anchor through the opening.

17 Claims, 22 Drawing Sheets

(56) References Cited

U.S. PATENT DOCUMENTS

| | | | |
|---|---|---|---|
| 9,079,536 B2* | 7/2015 | Mulla | F16B 37/0842 |
| 9,273,710 B1* | 3/2016 | Chang | F16M 13/02 |
| 2011/0268528 A1* | 11/2011 | Gaudron | F16B 13/0808 |
| | | | 411/44 |
| 2018/0372139 A1* | 12/2018 | Daly | F16B 13/0808 |
| 2019/0331147 A1* | 10/2019 | McDuff | F16B 13/002 |

* cited by examiner

RATCHET TOGGLE CONNECTOR

FIELD

The present disclosure relates generally to fasteners for coupling together two or more workpieces.

BACKGROUND

Fasteners are well known and are widely used in the art for coupling together two or more objects.

Ratchet fasteners, such as cable ties, are well known and widely used in the art to bundle together a plurality of objects, such as wires. One type of cable tie comprises a serrated strap that is fitted to an apertured head containing an internal pawl or locking tang that engages the serrations of the strap. When the serrated strap is looped through the aperture head, the tie may be tightened around a bundle of objects. This type of cable tie is less useful when fastening two or more larger workpieces.

Two-piece ratchet fasteners with a cable tie shank having a tail with ratchet teeth and a button end, and a pawl nut are also known in the art, as described in U.S. Pat. No. 6,347,435. The cable tie can be inserted through a hole in one or more workpieces, and from the other side, the pawl nut can be used to fasten together the workpieces. While relatively simple in design, these two-piece ratchet fasteners are not compatible with one-sided use, or blind entry through workpieces.

Conventional toggle retainers are well known, and their advantages well described in the art. In particular, they are automatically self-adjusting for the depth of the blind entry through which they are placed (being similar to the thickness of the wall or workpiece(s) defining the blind entry) and they automatically adjust, within reasonable limits, to irregular seating surfaces. Such toggle retainers are typically fastened with a bolt or screw.

Fasteners which combine certain aspects of ratchet fasteners and toggle retainers are known. For example, the dual-tailed toggle retainer described in U.S. Pat. No. 4,286,497 utilizes a ratchet bar and ratchet retainer to secure the toggle retainer in the blind entry, where the excess length of the ratchet bar is removed to permit a conventional screw fastener to be engaged through the blind entry to the toggle wing assembly. Similarly, U.S. Pat. No. 6,161,999 discloses a toggle bolt device comprising two elongated control legs that, in cooperation with a user's fingertip sliding, cause a metal anchor member to pivot from substantially in line with an insertion aperture in the substrate, to a position parallel to the substrate when the second ends of the control legs are aligned with each other. Once the metal member is positioned behind the substrate and abutted thereto a collar is ratcheted to a snug fit with the substrate and the legs are broken off to thereby fix the anchor in place.

The aforementioned ratchet toggle fasteners are compatible with insertion into and securing behind a blind entry, but require significant dexterity of the user both for insertion of the fastener through the workpieces, and in fastening the device. Furthermore, these devices are formed from several machined parts and disclose metal anchoring members. The complexity and expense of manufacturing such devices can be prohibitive for certain applications.

BRIEF DESCRIPTION OF THE DRAWINGS

Embodiments will now be described, by way of example only, with reference to the attached Figures.

DESCRIPTION

A ratchet toggle connector with an anchor ribbon and a retaining cap, as described herein, is useful for blind entry through one or more workpieces. It is simple and inexpensive to manufacture. In some embodiments, the anchor ribbon may be a single machined part and/or formed from plastic. Such a design may be light and easily portable. Such a ratchet toggle connector does not require additional tools or fasteners for use, and is an improvement with respect to the level of dexterity required by the user.

The aforementioned attributes are desirable for fastening workpieces in general, but may be more highly advantageous for use when a user's dexterity is limited, for example, by gloves. Additionally, the portability of the ratchet toggle connector of the present invention may be particularly advantageous for fastening workpieces in remote locations, or applications which require the user to be mobile. These features may be particularly useful in applications such as securing pipeline shield panels for protecting pipelines in buried pipeline installations.

Figure 1:
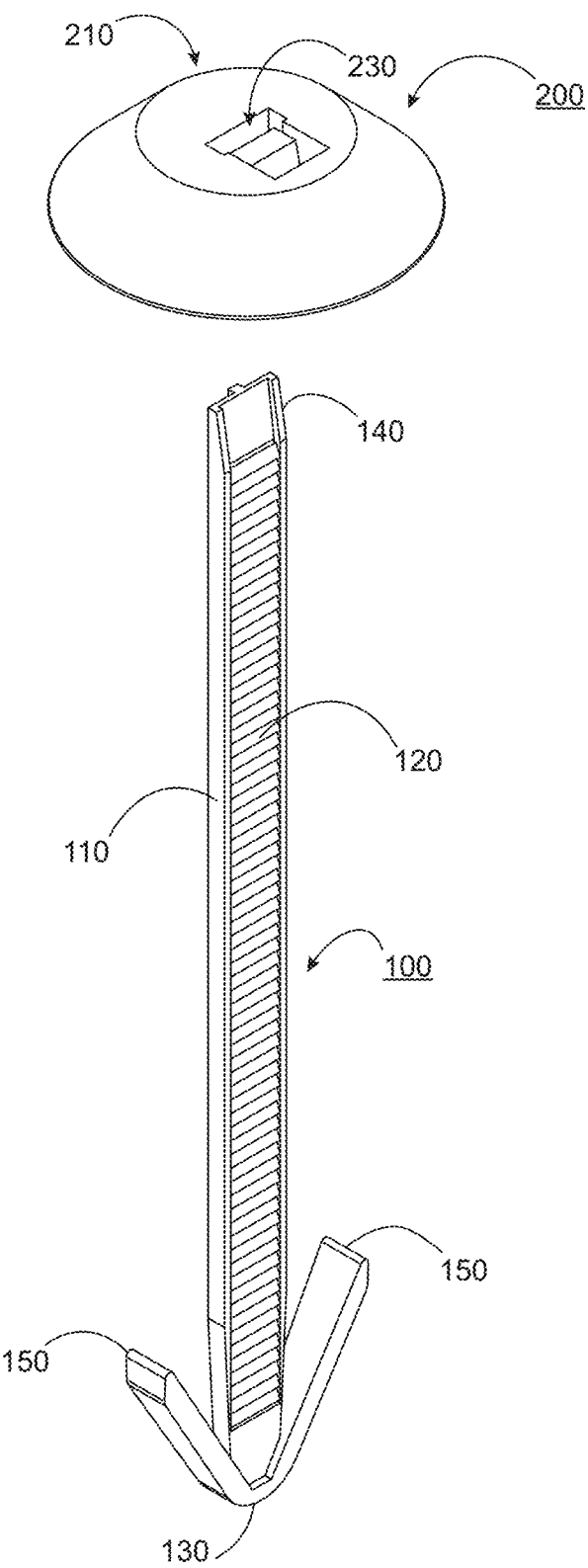
FIG. 1 is a perspective view of a ratchet toggle connector according to a first embodiment of the invention, having one integrated gear rack and tapered wings that extend in the same plane as the gear rack.
Figure 2:
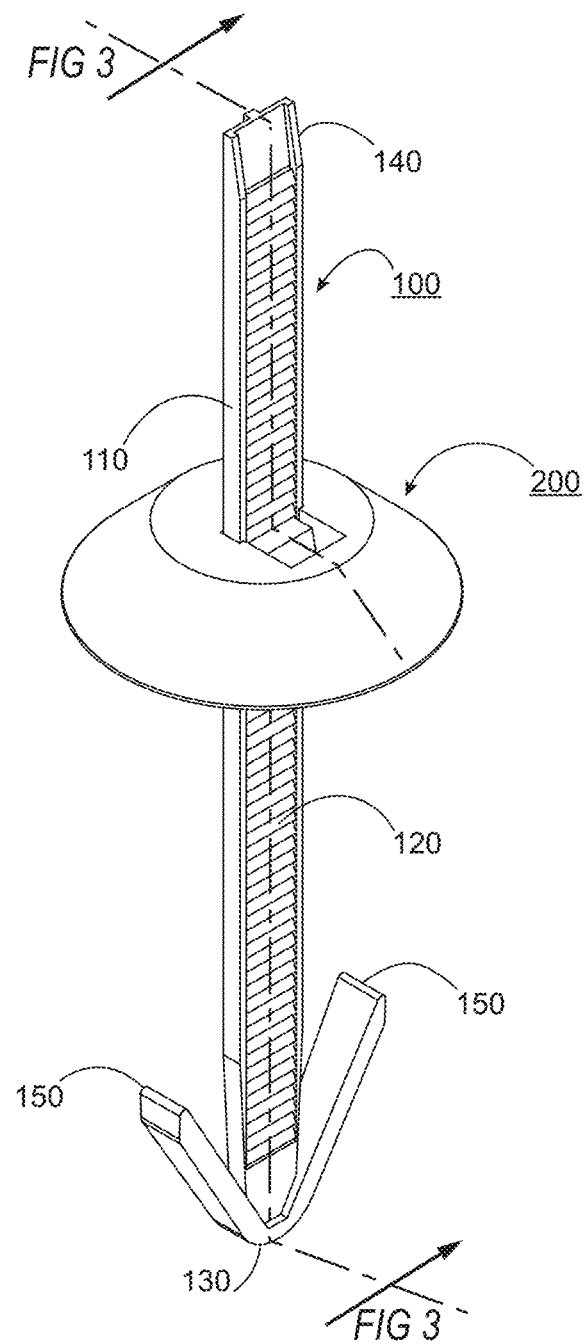
FIG. 2 is a perspective view of a ratchet toggle connector according to FIG. 1.
Figure 3:
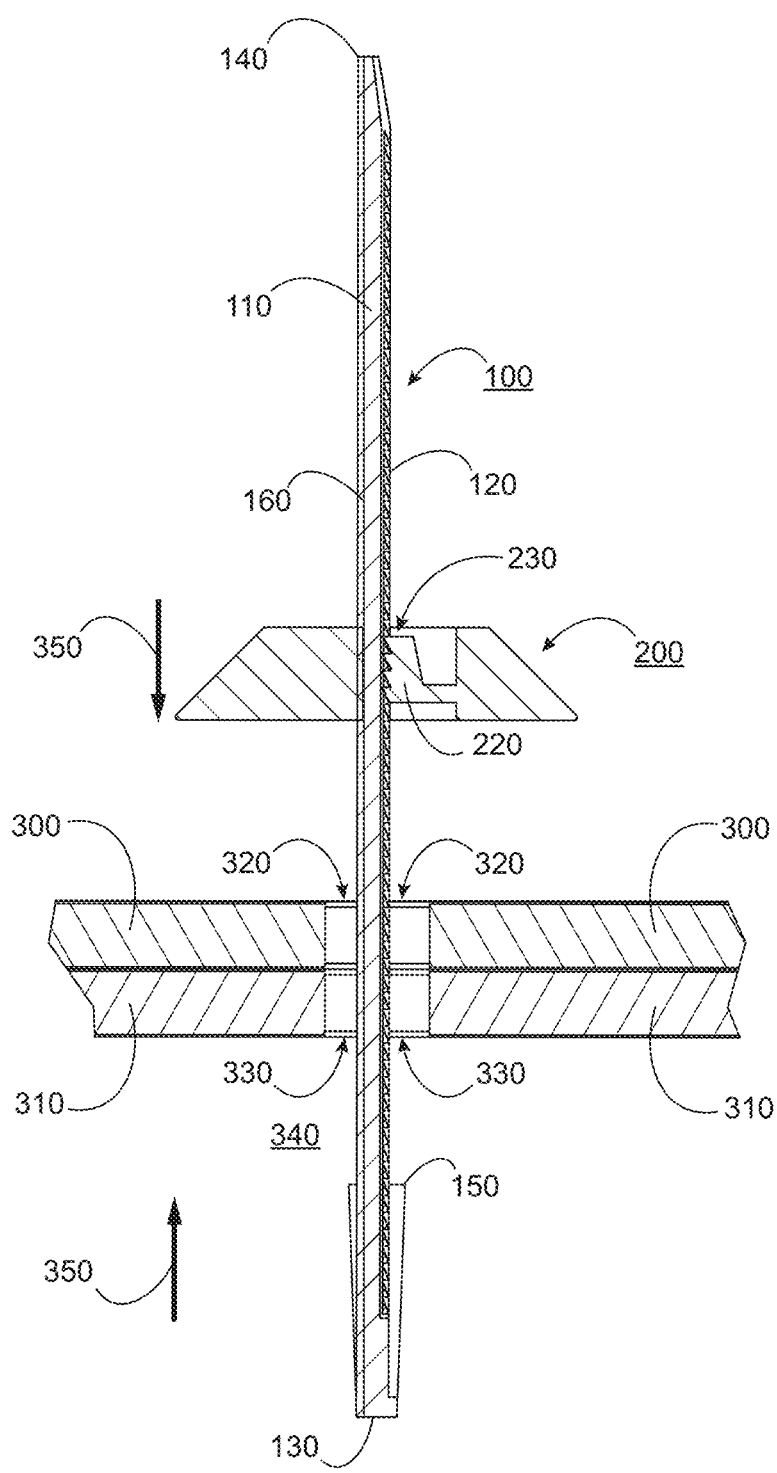
FIG. 3 is a cross-sectional elevation view thereof.
Figure 4:
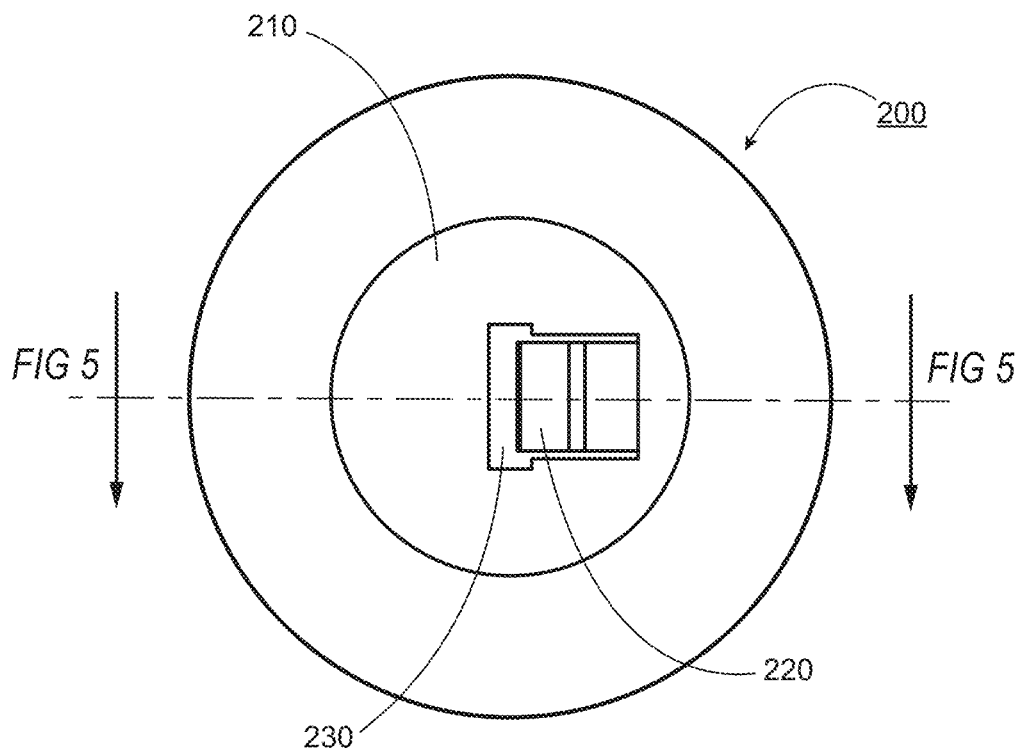
FIG. 4 is a top plan view of a retaining cap shown in FIGS. 1-3.
Figure 5:
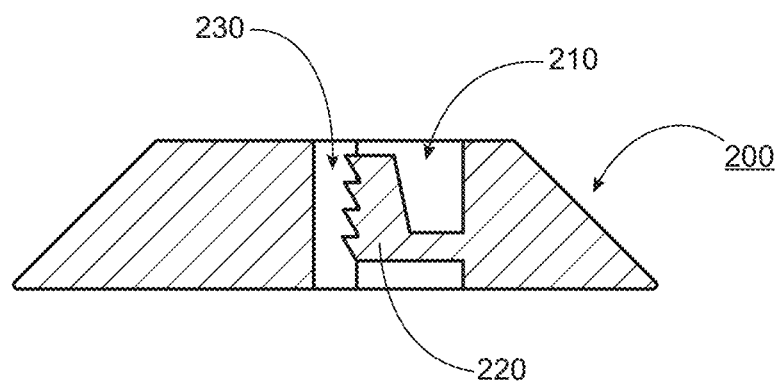
FIG. 5 is a corresponding cross-sectional elevation view of the retaining cap of FIG. 4.
Figure 6:
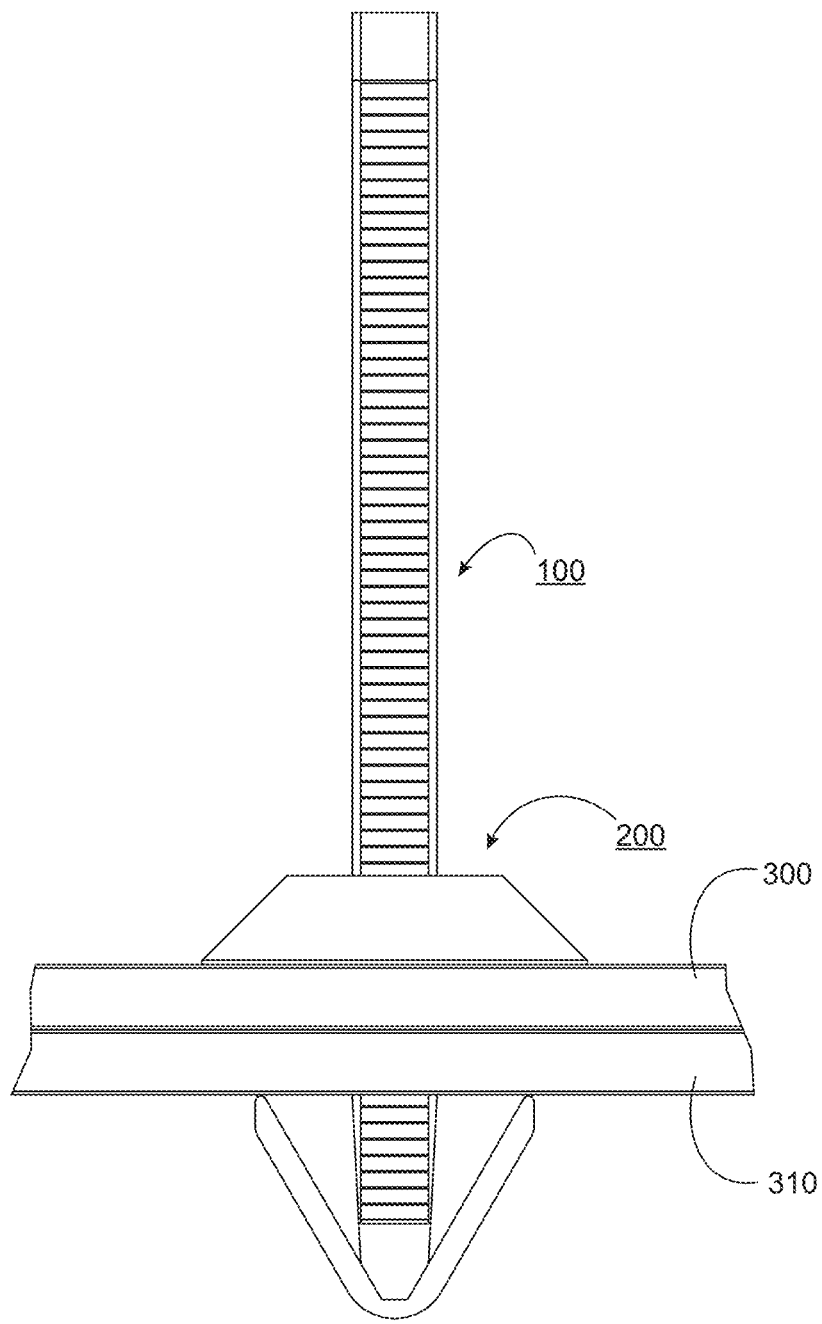
FIG. 6 is an elevation view of the ratchet toggle connector according to FIGS. 1-5 sandwiching two workpieces.

FIGS. 1-6 show a first embodiment of a ratchet toggle connector. FIG. 1 shows anchor ribbon 100 and retaining cap 200. The anchor ribbon 100 has an extended ribbon 110 with an integrated gear rack 120. The anchor ribbon 100 has an anchor end 130 and a free end 140. Bendably joined to the anchor end 130 are a pair of tapered wings 150 extending in the same plane as the plane of the gear rack 120. As shown particularly in FIGS. 4 and 5, the retaining cap 200 forms a case 210 which houses a pawl 220. The case 210 of retaining cap 200 forms a slot 230 sized and shaped to receive the free end 140 of the ribbon. FIGS. 2 and 3 show how the anchor ribbon 100 and retaining cap 200 engage. FIG. 3 shows that the extended ribbon 110 has one integrated gear rack 120 on one face, and the opposite face 160 does not have an integrated gear rack. FIG. 3 shows how integrated gear rack 120 of anchor ribbon 100 and the pawl 220 of retaining cap 200 engage to resist retraction of the retaining cap 200 when the extended ribbon 110 is received into the slot 230. As shown particularly in FIG. 3, in some embodiments, the anchor ribbon 100 and retaining cap 200 as described herein may be used to fasten workpieces 300, 310 with respective openings 320, 330 by positioning the two workpieces to overlap the respective openings 320, 330, inserting the anchor end 130 of the extended ribbon 110 through the overlapped openings 320, 330, thereby causing the tapered wings 150 to bend into the collapsed state so as to enable passage of the anchor end 130 and tapered wings 150 through the overlapped openings 320, 330, until the tapered wings 150 rebound at an opposite side 340 of the overlapped openings 320, 330, threading the free end 140 of the extended ribbon 110 into the slot 230 of the retaining cap 200, and moving the retaining cap 200 and anchor together until the retaining cap 200 and anchor sandwich the workpieces 300, 310, as illustrated by arrows 350. FIG. 6 shows anchor ribbon 100 and retaining cap 200 sandwiching workpieces 300 and 310.

In some embodiments, the extended ribbon has a face and the integrated gear rack is formed on the face. In some embodiments, the extended ribbon may have more than one face, and the extended ribbon may have integrated gear racks on two opposite faces. In some embodiments the retaining cap may have a single flexible pawl. In some embodiments the slot 230 may form opposing surfaces having one or more flexible pawl teeth, and the pawl teeth may be configured to engage corresponding opposing integrated gear racks.

Figure 7:
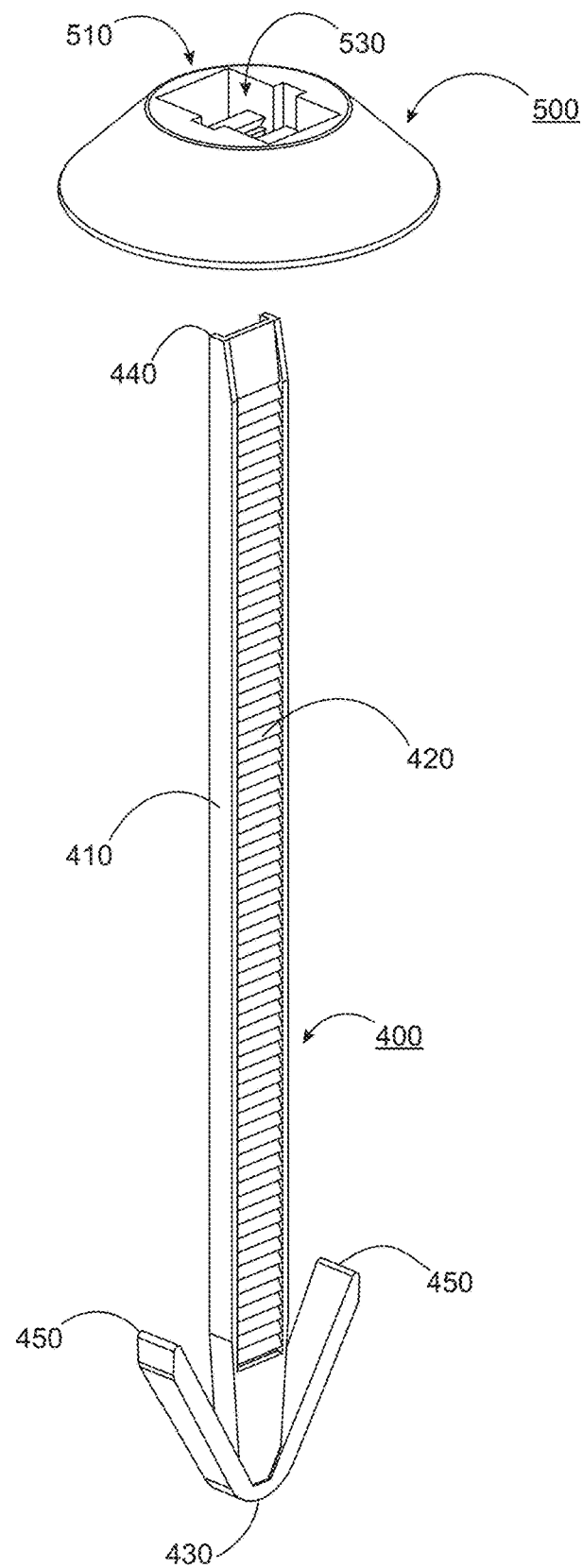
FIG. 7 is a perspective view of a ratchet toggle connector according to a second embodiment of the invention, having two integrated gear racks and tapered wings that extend in the same plane as the gear racks.
Figure 8:
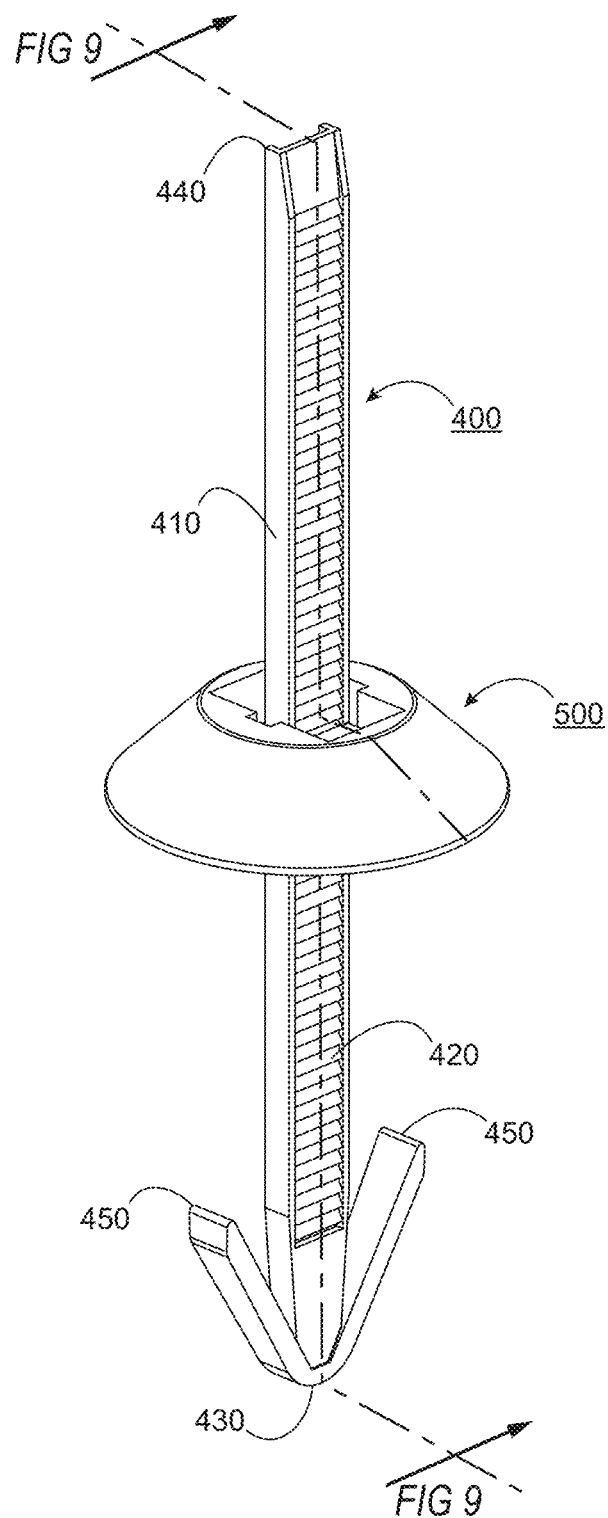
FIG. 8 is a perspective view of the ratchet toggle connector according to FIG. 7.
Figure 9:
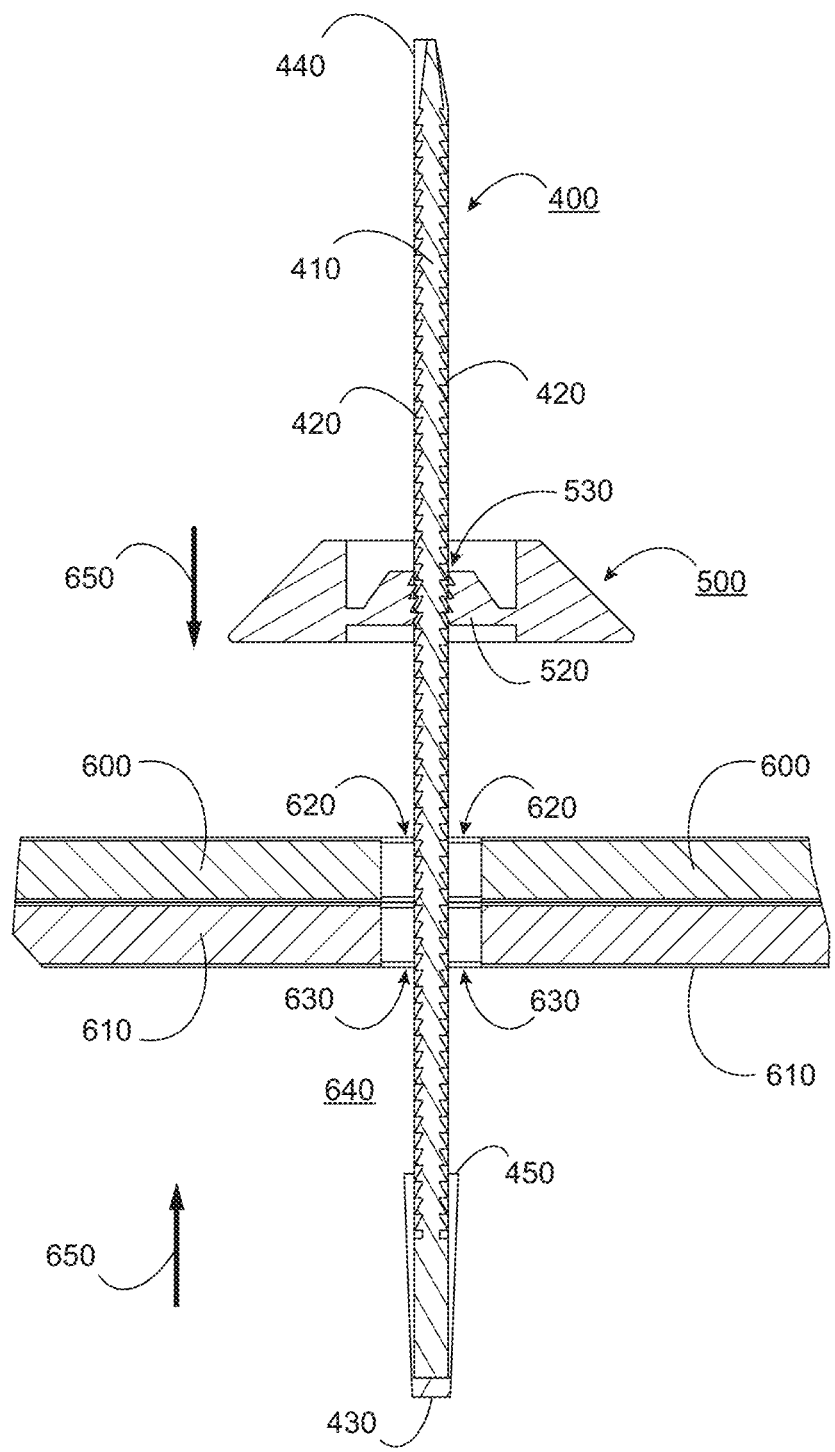
FIG. 9 is a cross-sectional elevation view thereof.
Figure 10:
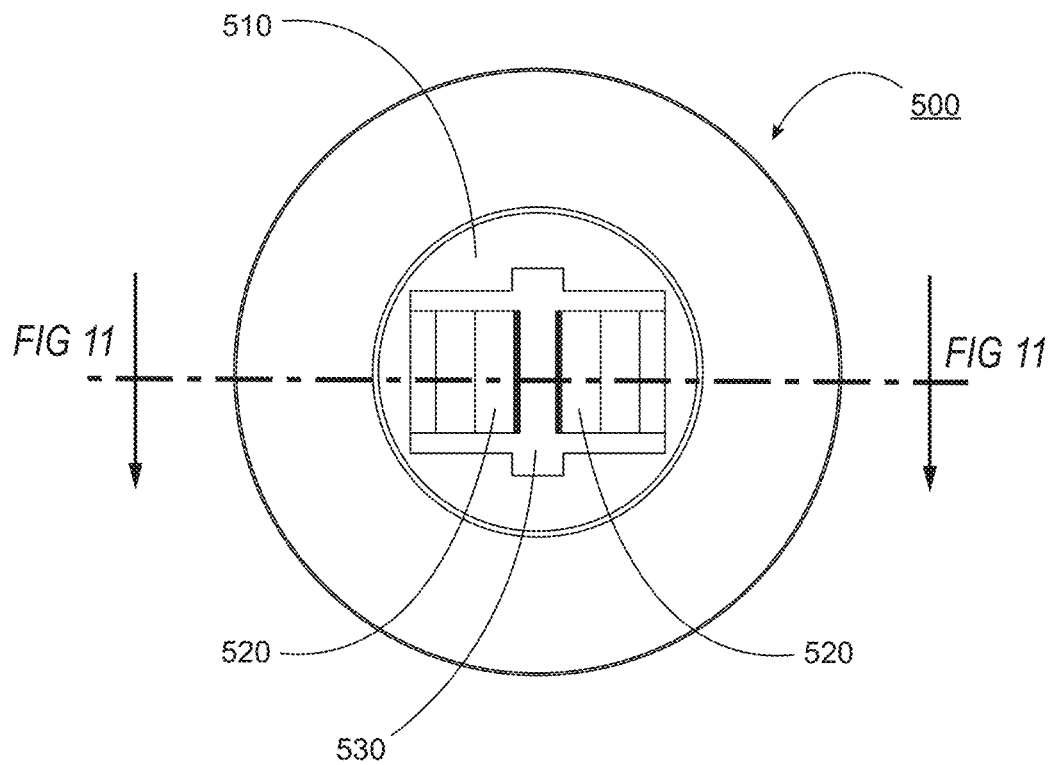
FIG. 10 is a top plan view of a retaining cap shown in FIGS. 7-9.
Figure 11:
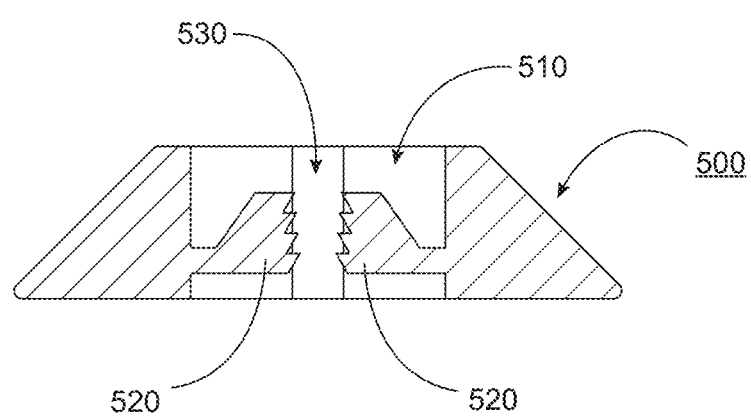
FIG. 11 is a corresponding cross-sectional elevation view of the retaining cap of FIG. 4.

FIGS. 7-12 show a second embodiment of a ratchet toggle connector. FIG. 7 shows anchor ribbon 400 and retaining cap 500. The anchor ribbon 400 has an extended ribbon 410 with an integrated gear rack 420. The anchor ribbon 400 has an anchor end 430 and a free end 440. Bendably joined to the anchor end 430 are a pair of tapered wings 450 extending in the same plane as the plane of the gear rack 420. As shown particularly in FIGS. 10 and 11, the retaining cap 500 forms a case 510 which houses two pawls 520. The case 510 of retaining cap 500 forms a slot 530 sized and shaped to receive the free end 440 of the ribbon. FIGS. 8 and 9 show how the anchor ribbon 400 and retaining cap 500 engage. FIG. 9 shows that the extended ribbon 410 has two integrated gear racks 420 on two opposite faces. FIG. 9 shows how integrated gear racks 420 of anchor ribbon 400 and the pawls 520 of retaining cap 500 engage to resist retraction of the retaining cap 500 when the extended ribbon 410 is received into the slot 530.

Figure 12:
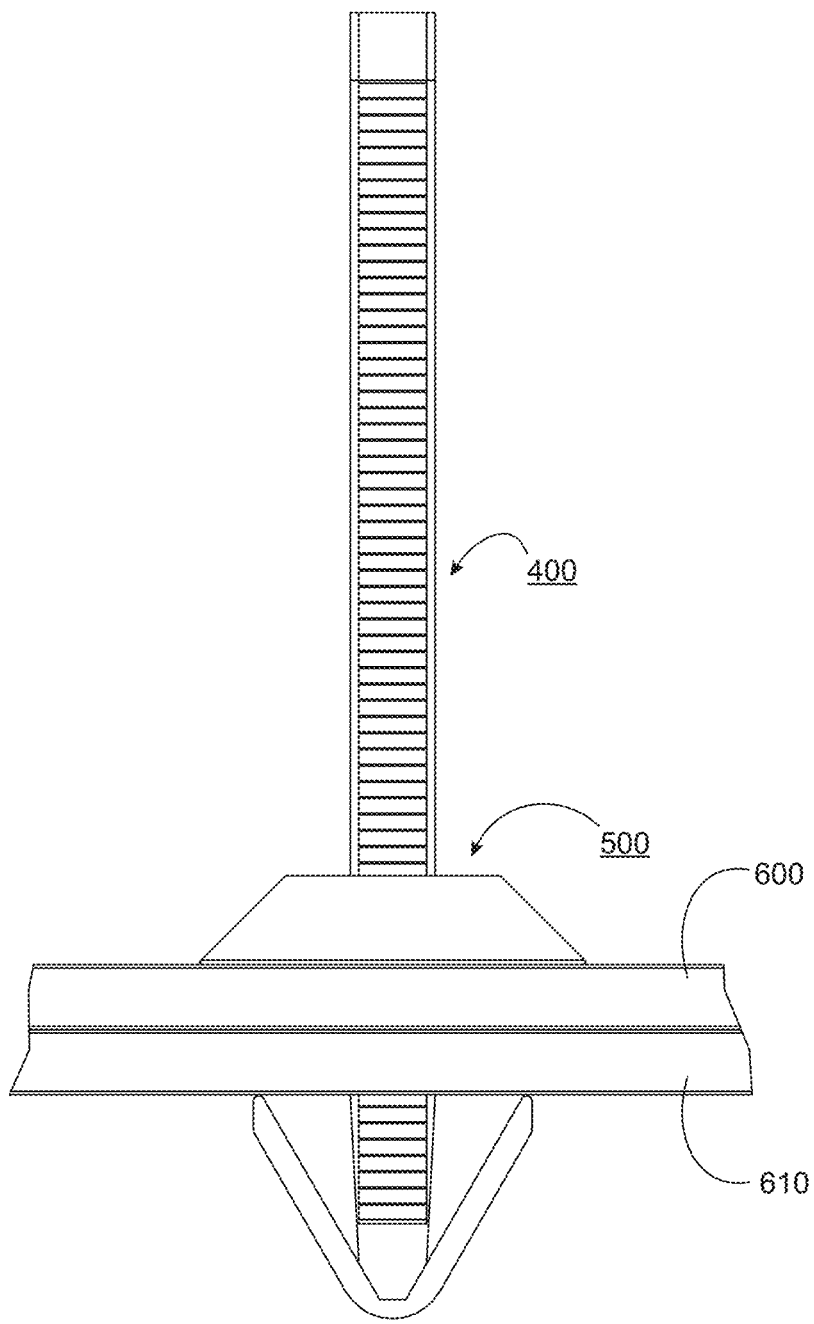
FIG. 12 is an elevation view of the ratchet toggle connector according to FIGS. 7-11 sandwiching two workpieces.

As shown particularly in FIG. 9, in some embodiments, the anchor ribbon 400 and retaining cap 500 as described herein may be used to fasten workpieces 600, 610 with respective openings 620, 630 by positioning the two workpieces to overlap the respective openings 620, 630, inserting the anchor end 430 of the extended ribbon 410 through the overlapped openings 620, 630, thereby causing the tapered wings 450 to bend into the collapsed state so as to enable passage of the anchor end 430 and tapered wings 450 through the overlapped openings 620, 630, until the tapered wings 450 rebound at an opposite side 640 of the overlapped openings 620, 630, threading the free end 440 of the extended ribbon 410 into the slot 530 of the retaining cap 500, and moving the retaining cap 500 and anchor together until the retaining cap 500 and anchor sandwich the workpieces 600, 610, as illustrated by arrows 650. FIG. 12 shows anchor ribbon 400 and retaining cap 500 sandwiching workpieces 600 and 610.

Figure 13:
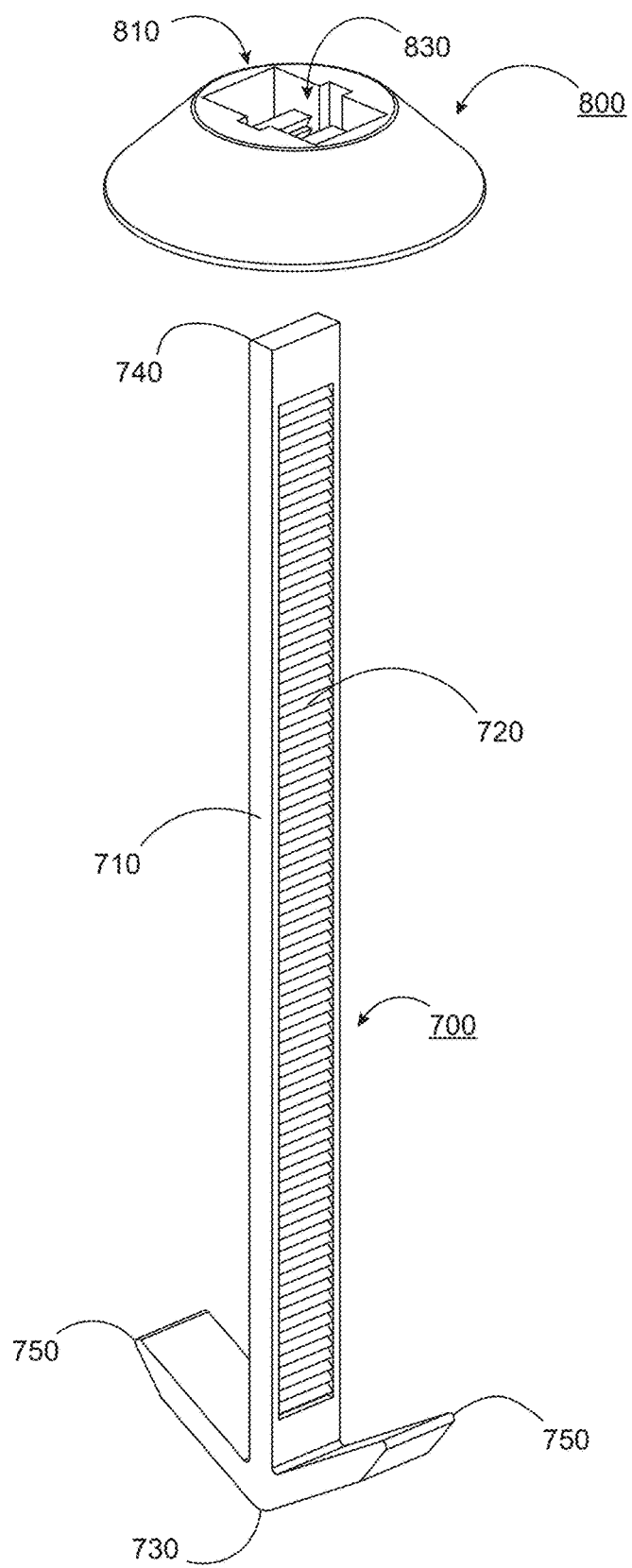
FIG. 13 is a perspective view of a ratchet toggle connector according to a third embodiment of the invention, having two integrated gear racks and tapered wings that extend in a plane orthogonal to the plane of the gear racks.
Figure 14:
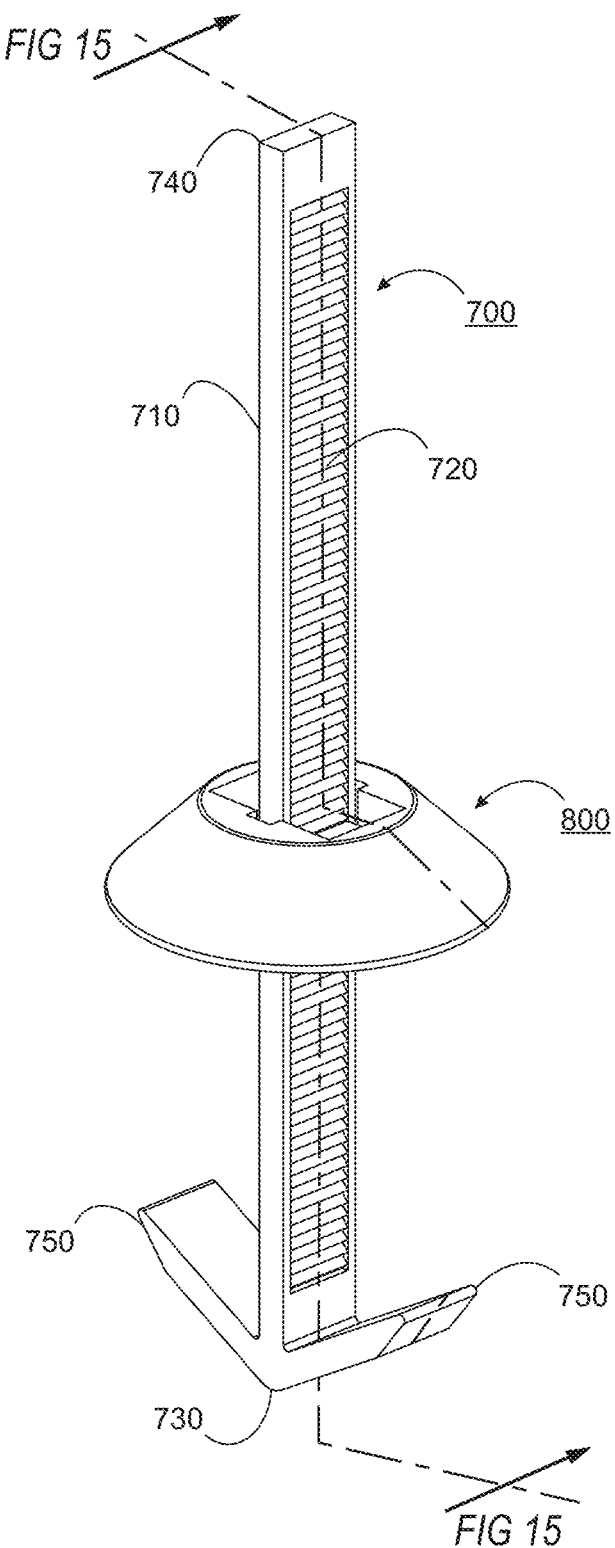
FIG. 14 is a perspective view of the ratchet toggle connector according to FIG. 13.
Figure 15:
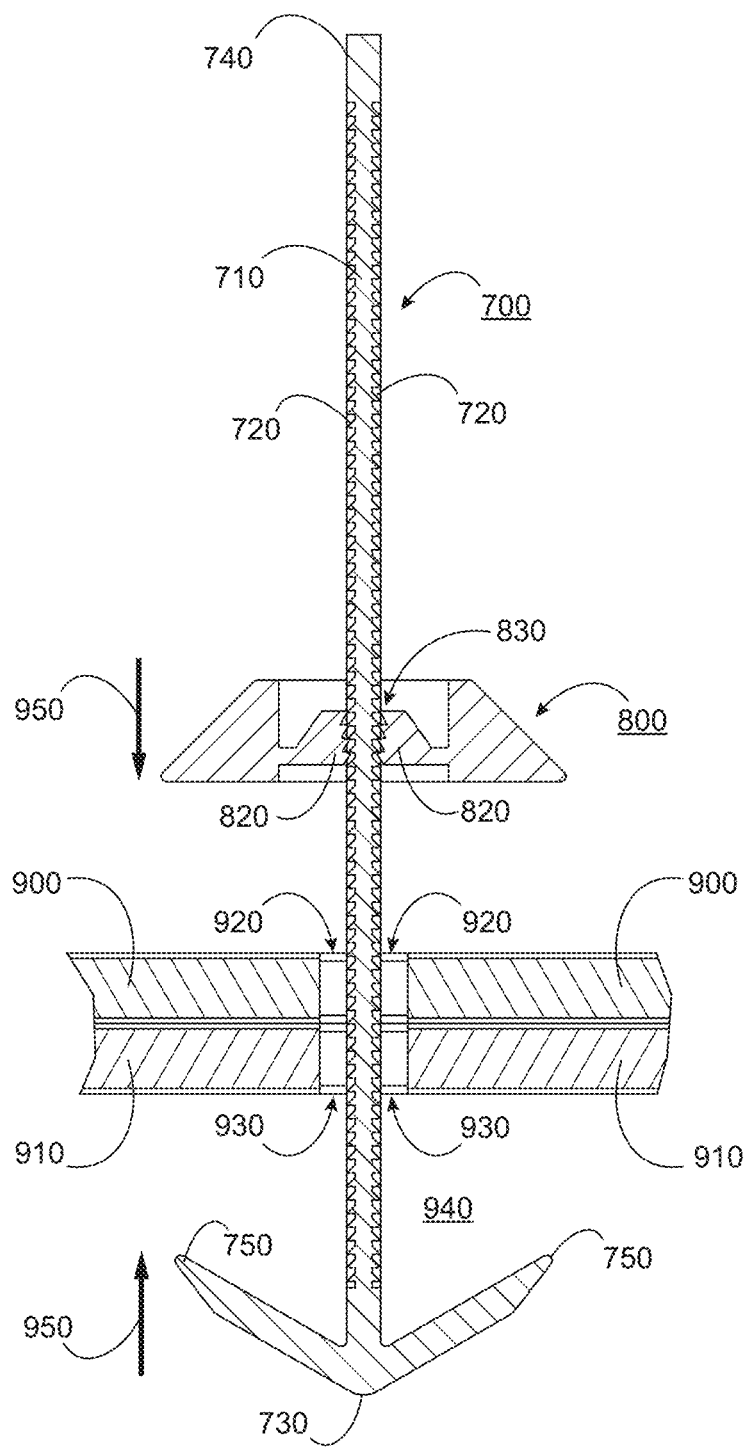
FIG. 15 is a cross-sectional elevation view thereof.
Figure 16:
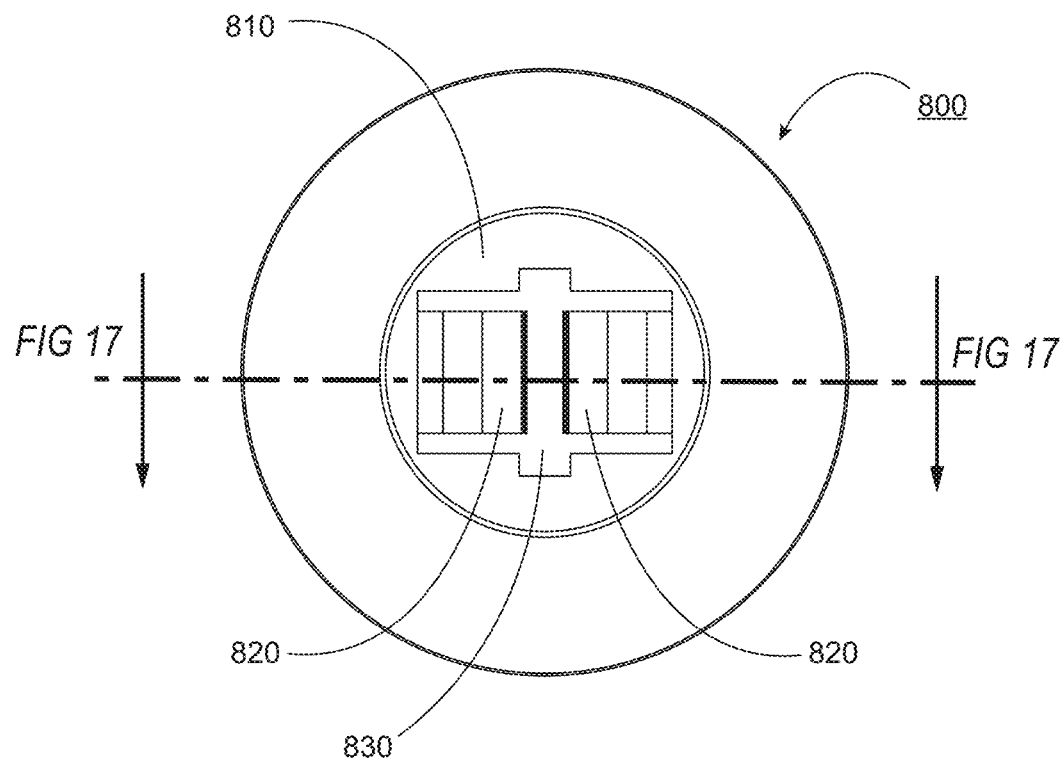
FIG. 16 is a top plan view of a retaining cap shown in FIGS. 13-15.
Figure 17:
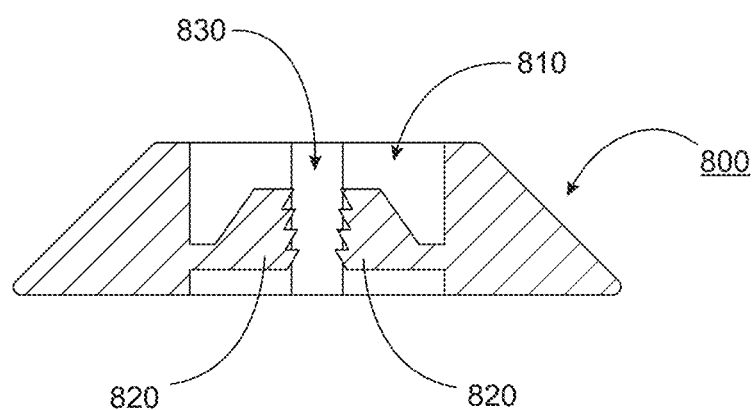
FIG. 17 is a corresponding cross-sectional elevation view of the retaining cap of FIG. 16.

FIGS. 13-18 show a third embodiment of a ratchet toggle connector. FIG. 13 shows anchor ribbon 700 and retaining cap 800. The anchor ribbon 700 has an extended ribbon 710 with an integrated gear rack 720. The anchor ribbon 700 has an anchor end 730 and a free end 740. Bendably joined to the anchor end 730 are a pair of tapered wings 750 extending in a plane orthogonal to the plane of the gear rack 720. As shown particularly in FIGS. 16 and 17, the retaining cap 800 forms a case 810 which houses two pawls 820. The case 810 of retaining cap 800 forms a slot 830 sized and shaped to receive the free end 740 of the ribbon. FIGS. 14 and 15 show how the anchor ribbon 700 and retaining cap 800 engage. FIG. 15 shows that the extended ribbon 710 has two integrated gear racks 720 on two opposite faces. FIG. 15 shows how integrated gear racks 720 of anchor ribbon 700 and the pawls 820 of retaining cap 800 engage to resist retraction of the retaining cap 800 when the extended ribbon 710 is received into the slot 830.

Figure 18:
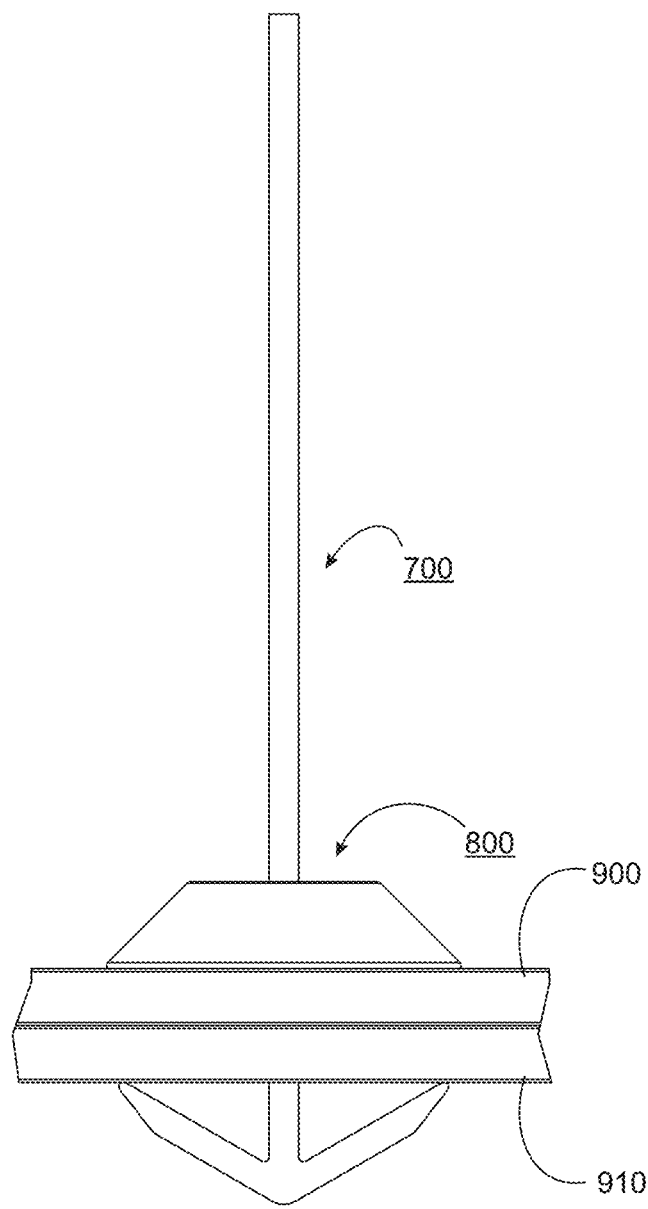
FIG. 18 is an elevation view of the ratchet toggle connector according to FIGS. 13-17 sandwiching two workpieces.

As shown particularly in FIG. 15, in some embodiments, the anchor ribbon 700 and retaining cap 800 as described herein may be used to fasten workpieces 900, 910 with respective openings 920, 930 by positioning the two workpieces to overlap the respective openings 920, 930, inserting the anchor end 730 of the extended ribbon 710 through the overlapped openings 920, 930, thereby causing the tapered wings 750 to bend into the collapsed state so as to enable passage of the anchor end 730 and tapered wings 750 through the overlapped openings 920, 930, until the tapered wings 750 rebound at an opposite side 940 of the overlapped openings 920, 930, threading the free end 740 of the extended ribbon 710 into the slot 830 of the retaining cap 800, and moving the retaining cap 800 and anchor together until the retaining cap 800 and anchor sandwich the workpieces 900, 910, as illustrated by arrows 950. FIG. 18 shows anchor ribbon 700 and retaining cap 800 sandwiching workpieces 900 and 910.

Figure 19:
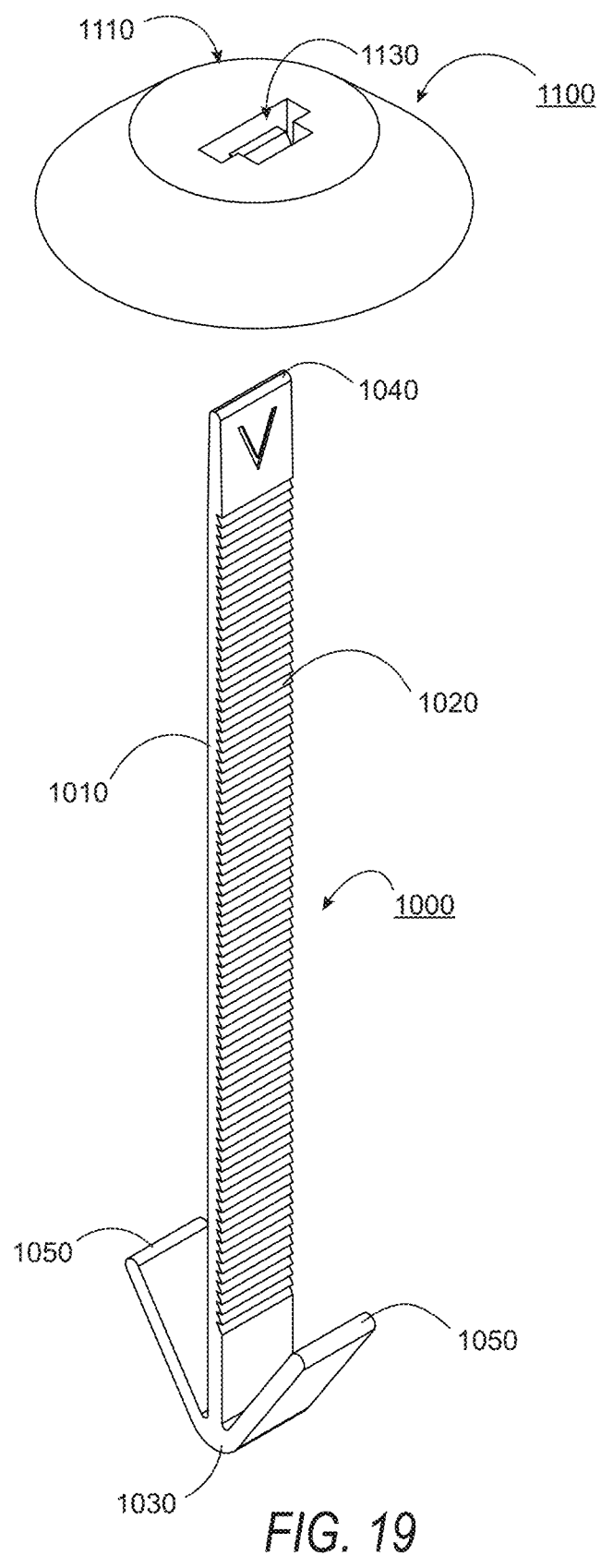
FIG. 19 is a perspective view of a ratchet toggle connector according to a fourth embodiment of the invention, having an integrated gear rack spanning a full width of the extended ribbon, and tapered wings that extend in a plane orthogonal to the plane of the gear rack.
Figure 20:
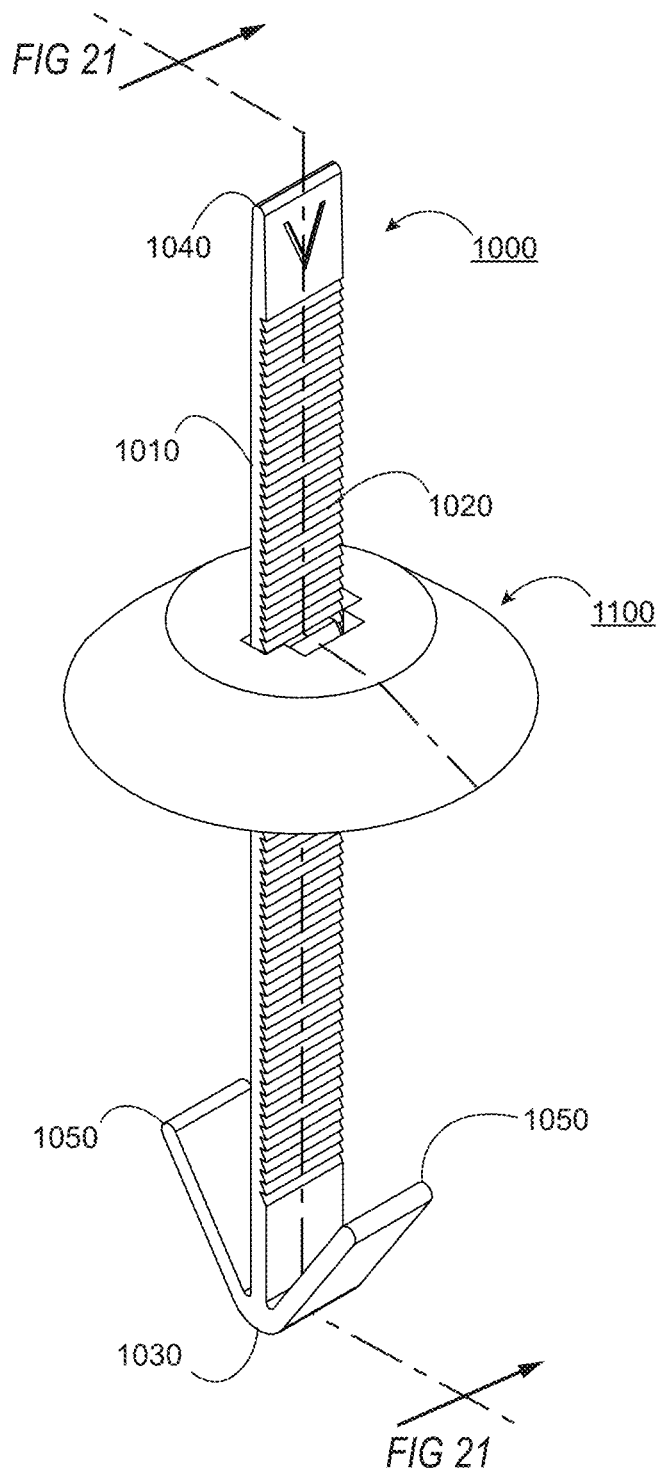
FIG. 20 is a perspective view of the ratchet toggle connector according to FIG. 19.
Figure 21:
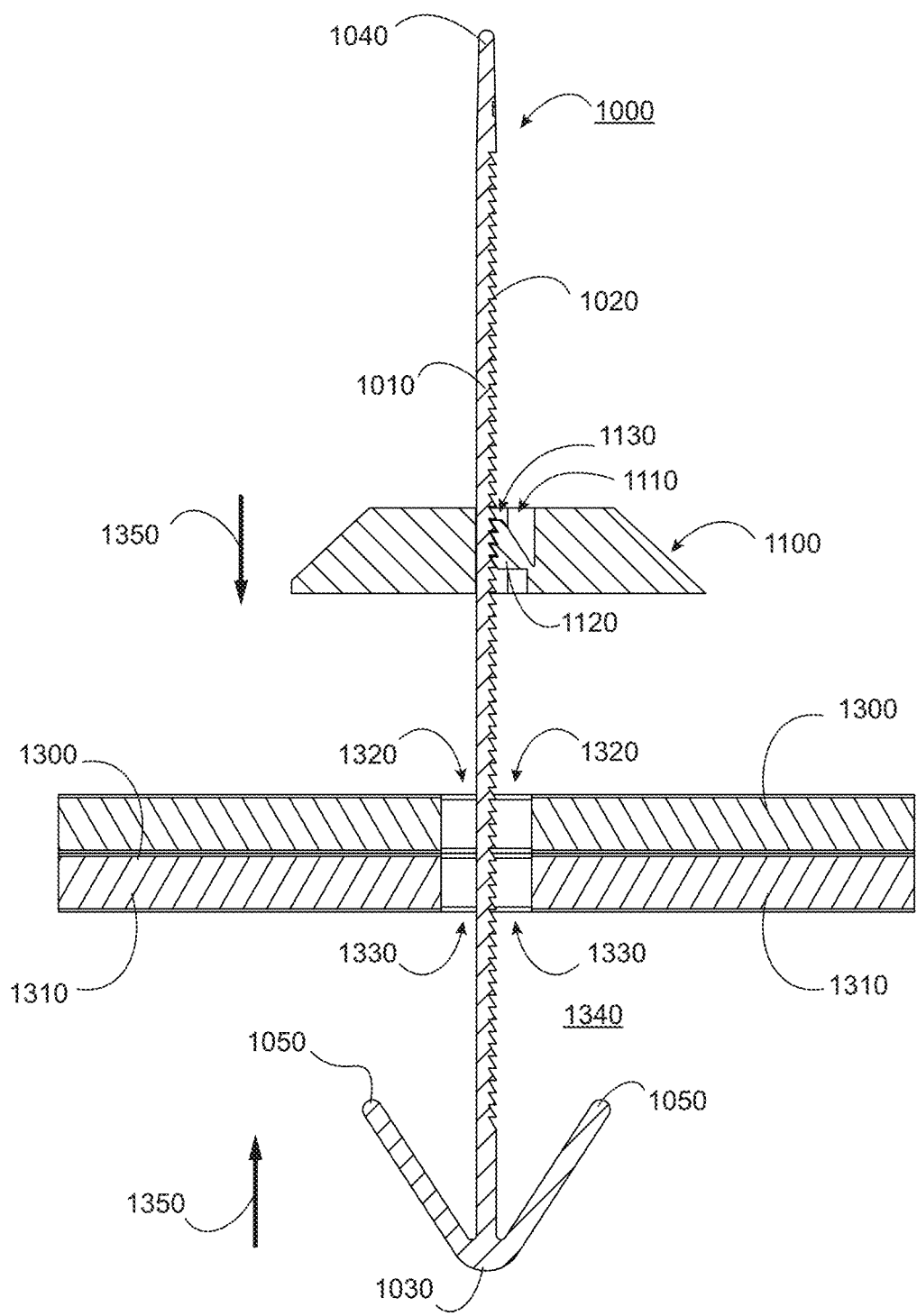
FIG. 21 is a cross-sectional elevation view thereof.

FIGS. 19-21 show a fourth embodiment of a ratchet toggle connector. FIG. 19 shows anchor ribbon 1000 and retaining cap 1100. The anchor ribbon 1000 has an extended ribbon 1010 with an integrated gear rack 1020. The gear rack 1020 extends an entire transverse width of the extended ribbon 1010. The anchor ribbon 1000 has an anchor end 1030 and a free end 1040. Bendably joined to the anchor end 1030 are a pair of tapered wings 1050 extending in a plane orthogonal to the plane of the gear rack 1020. The retaining cap 1100 forms a case 1110 which houses a pawl 1120. The case 1110 of retaining cap 1100 forms a slot 1130 sized and shaped to receive the free end 1040 of the ribbon, FIGS. 20 and 21 show how the anchor ribbon 1000 and retaining cap 1100 engage. FIG. 21 shows that the extended ribbon 1010 has one integrated gear rack 1020 on one face. FIG. 21 shows how the integrated gear rack 1020 of anchor ribbon 1000 and the pawl 1120 of retaining cap 1100 engage to resist retraction of the retaining cap 1100 when the extended ribbon 1010 is received into the slot 1130.

As shown particularly in FIG. 21, the anchor ribbon 1000 and retaining cap 1100 as described herein may be used to fasten workpieces 1300, 1310 with respective openings 1320, 1330 by positioning the two workpieces to overlap the respective openings 1320, 1330, inserting the anchor end 1030 of the extended ribbon 1010 through the overlapped openings 1320, 1330, thereby causing the tapered wings 1050 to bend into the collapsed state so as to enable passage of the anchor end 1030 and tapered wings 1050 through the overlapped openings 1320, 1330, until the tapered wings 1050 rebound at an opposite side 1340 of the overlapped openings 1320, 1330, threading the free end 1040 of the extended ribbon 1010 into the slot 1130 of the retaining cap 1100, and moving the retaining cap 1100 and anchor together until the retaining cap 1100 and anchor sandwich the workpieces 1300, 1310, as illustrated by arrows 1350.

Figure 22:
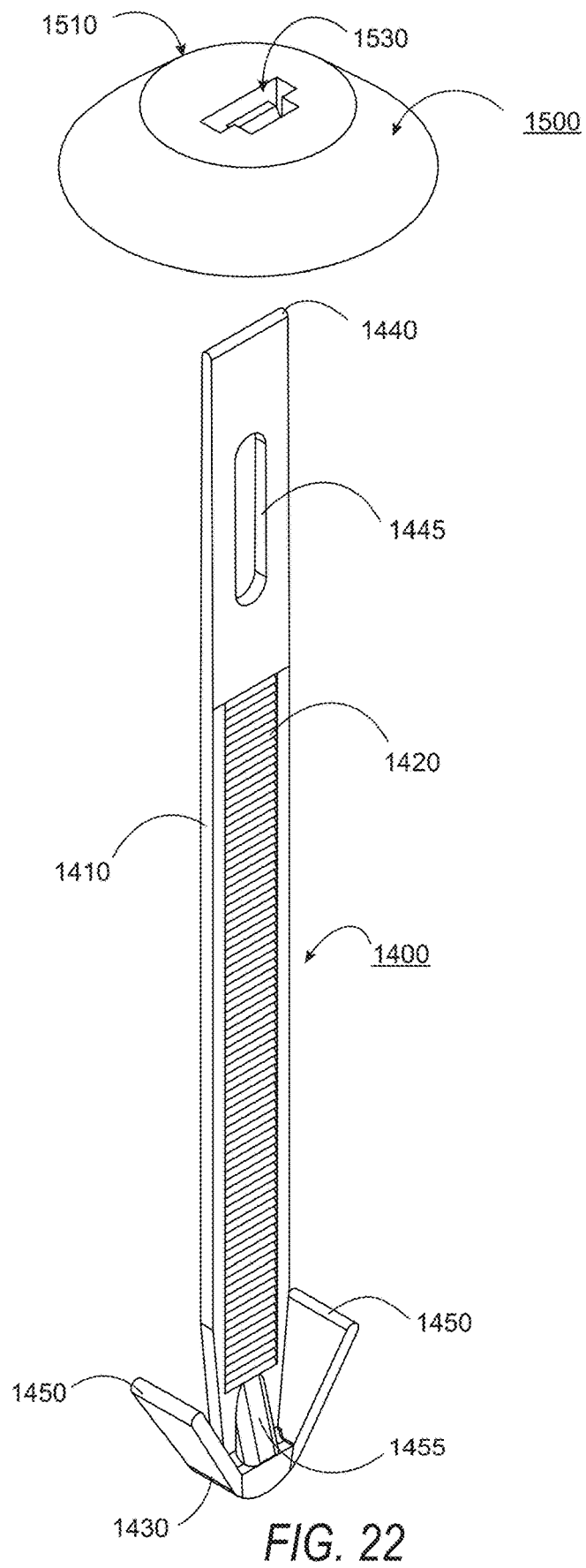
FIG. 22 is a perspective view of a ratchet toggle connector according to a fifth embodiment of the invention, having an integrated gear rack spanning less than a full length of the extended ribbon, the extended ribbon having a slot, and tapered wings that extend in a plane of the gear rack.
Figure 23:
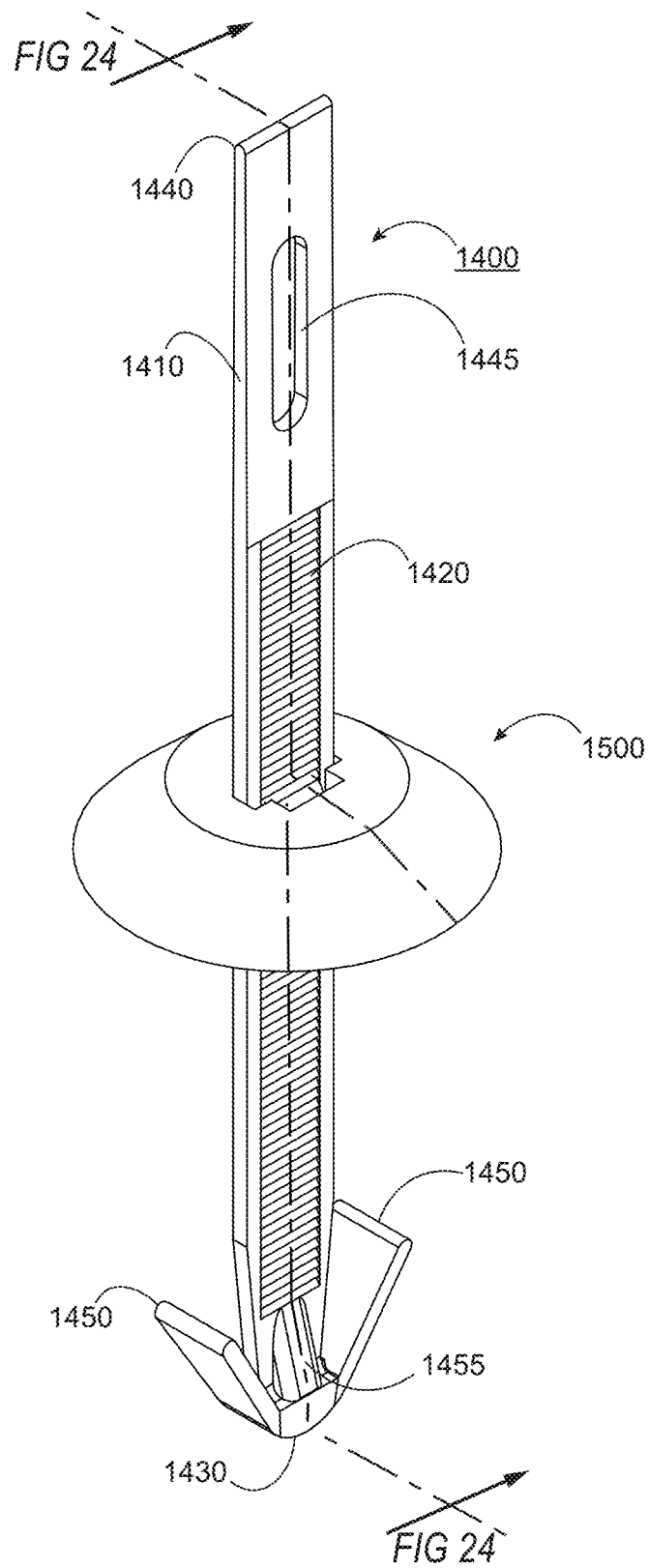
FIG. 23 is a perspective view of the ratchet toggle connector according to FIG. 12.
Figure 24:
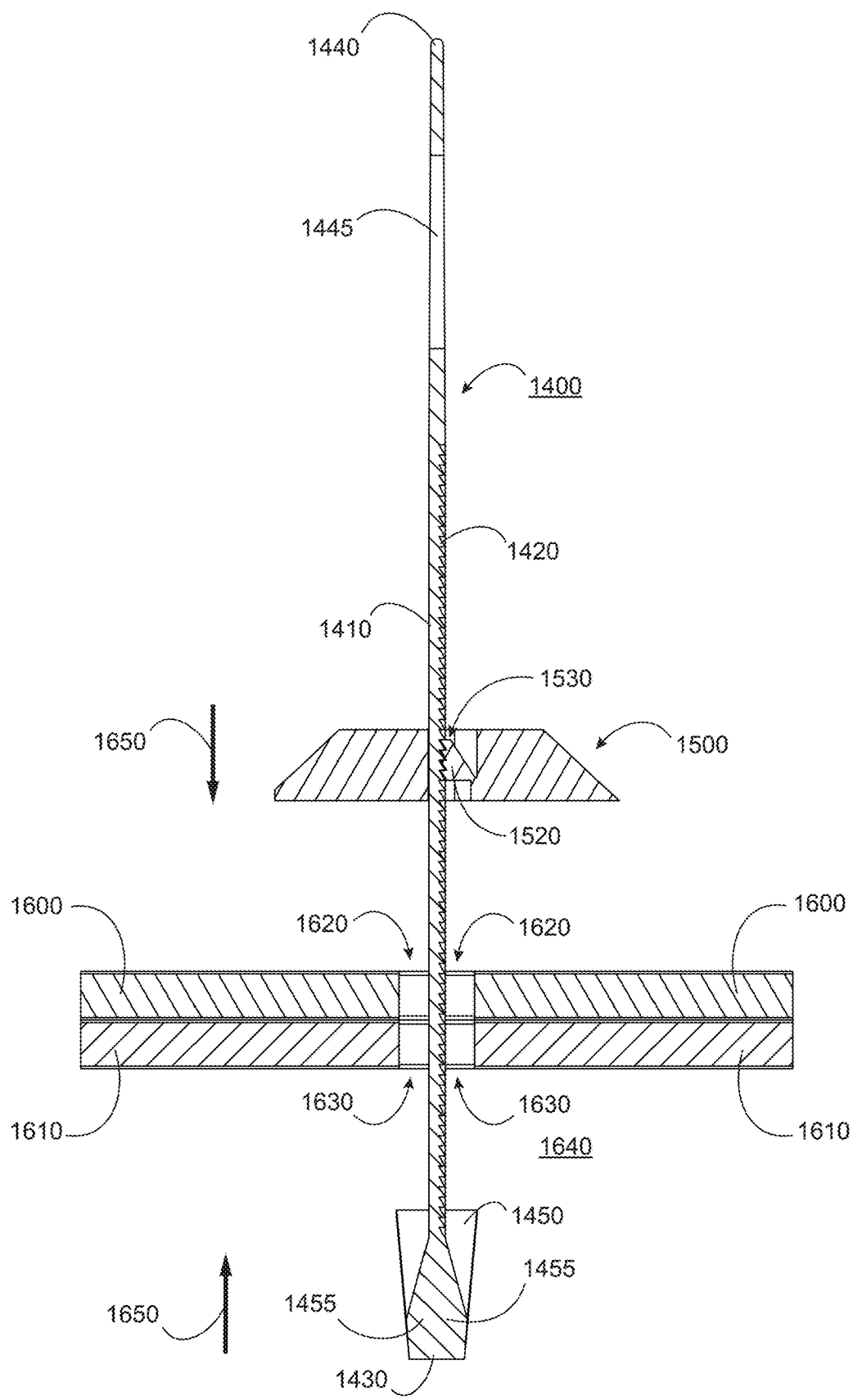
FIG. 24 is a cross-sectional elevation view thereof.
Figure 25:
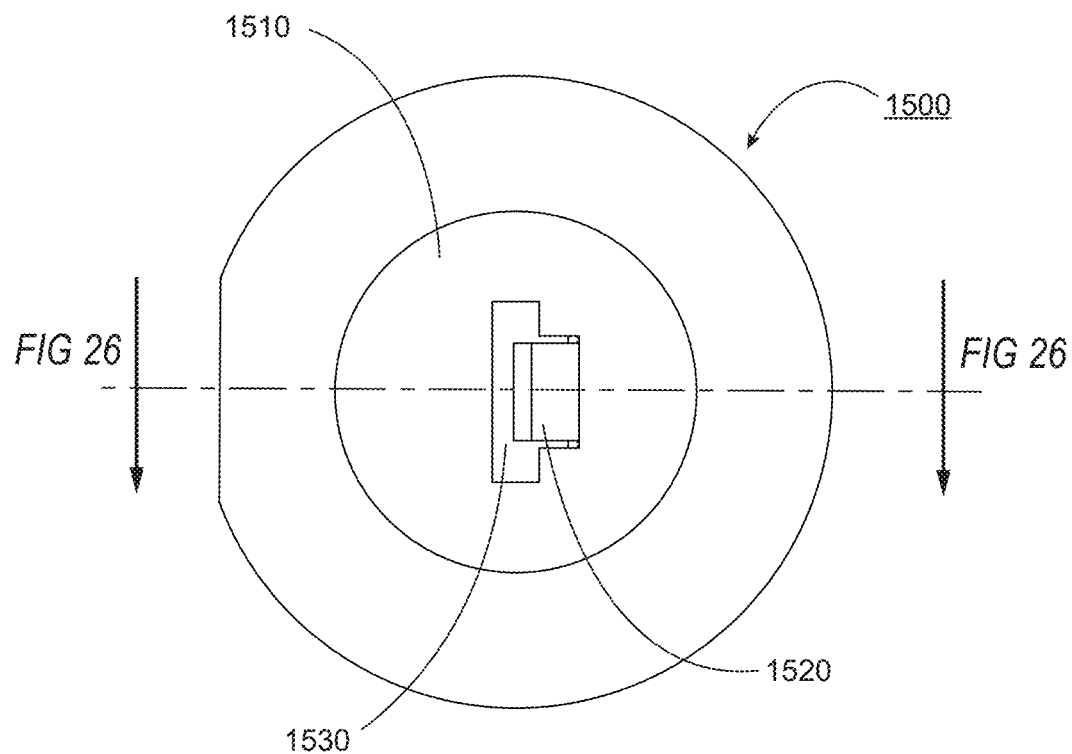
FIG. 25 is a top plan view of a retaining cap shown in FIGS. 22 & 23.
Figure 26:
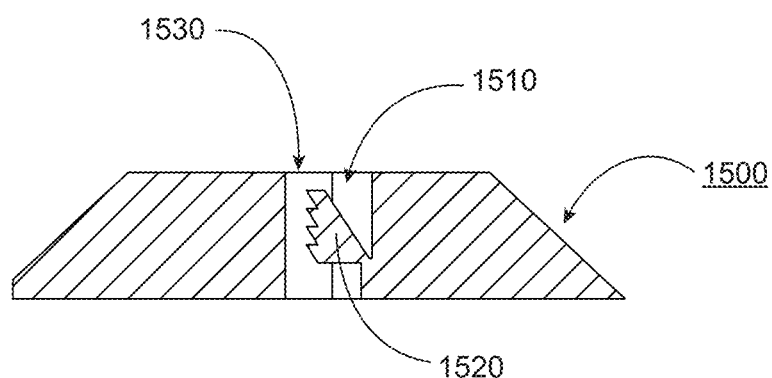
FIG. 26 is a corresponding cross-sectional elevation view of the retaining cap of FIG. 25.

FIGS. 22-26 show a fifth embodiment of a ratchet toggle connector. FIG. 22 shows anchor ribbon 1400 and retaining cap 1500. The anchor ribbon 1400 has an extended ribbon 1410 with an integrated gear rack 1420. The anchor ribbon 1400 has an anchor end 1430 and a free end 1440. The anchor ribbon 1400 further has a ribbon slot 1445 in the extended ribbon 1410. As shown, the gear rack 1420 may extend less than an entire length of the extended ribbon 1410, and the ribbon slot 1445 may therefore be formed in a portion of the extended ribbon 1410 other than the portion with the gear rack 1420. Alternatively, the ribbon slot 1445 may be formed in the portion with the gear rack 1420. Bendably joined to the anchor end 1430 are a pair of tapered wings 1450 extending in a plane co-planar with the plane of the extended ribbon 1410. The anchor ribbon 1400 may further have an anchor end gusset 1455 functional to reinforce the joint of the tapered wings 1450 with the anchor end 1430 of the extended ribbon 1410. The retaining cap 1500 forms a case 1510 which houses a pawl 1520. The case 1510 of retaining cap 1500 forms a slot 1530 sized and shaped to receive the free end 1440 of the ribbon. FIGS. 23 and 24 show how the anchor ribbon 1400 and retaining cap 1500 engage. FIG. 24 shows that the extended ribbon 1410 has one integrated gear rack 1420 on one face. FIG. 24 shows how the integrated gear rack 1420 of anchor ribbon 1400 and the pawl 1520 of retaining cap 1500 engage to resist retraction of the retaining cap 1500 when the extended ribbon 1410 is received into the slot 1530.

As shown particularly in FIG. 24, the anchor ribbon 1400 and retaining cap 1500 as described herein may be used to fasten workpieces 1600, 1610 with respective openings 1620, 1630 by positioning the two workpieces to overlap the respective openings 1620, 1630, inserting the anchor end 1430 of the extended ribbon 1410 through the overlapped openings 1620, 1630, thereby causing the tapered wings 1450 to bend into the collapsed state so as to enable passage of the anchor end 1430 and tapered wings 1450 through the overlapped openings 1620, 1630, until the tapered wings 1450 rebound at an opposite side 1640 of the overlapped openings 1620, 1630, threading the free end 1440 of the extended ribbon 1410 into the slot 1530 of the retaining cap 1500, and moving the retaining cap 1500 and anchor together until the retaining cap 1500 and anchor sandwich the workpieces 1600, 1610, as illustrated by arrows 1650.

The tapered wings 150, 450, 750, 1050, 1450 are configured to bend toward the extended ribbon 110, 410, 710, 1010, 1410 to a collapsed state for passage of the anchor 130, 430, 730, 1030, 1430 through an opening in a workpiece and to rebound to an expanded state following passage of the anchor 130, 430, 730, 1030, 1430 through the opening to prevent retraction of the anchor 130, 430, 730, 1030, 1430 through the opening. In some embodiments, the ratchet toggle connector has a first plane of the first face, and the tapered wings 150, 450, 1450 extend in the first plane. Examples of such embodiments are shown in FIGS. 1-12 & 22-26. In those embodiments, the extended ribbon may be formed from plastic and the configuration of the tapered wings may facilitate the moulding process. It should be noted that anchor end 130, 430, 730, 1030, 1430 is not limited to having a pair of tapered wings 150, 430, 730, 1030, 1430. Rather, anchor end 130, 430, 730, 1030, 1430 could have one or more wings, or be alternatively shaped, without departing from the spirit of the present invention.

The anchor ribbon 100, 400, 700, 1000, 1400 and retaining cap 200, 500, 800, 1100, 1500 may be manufactured and provided together, or as two separate pieces. For example, in some embodiments, the retaining cap may be attached to the anchor ribbon by a break-away attachment member, so as to retain the retaining cap and anchor ribbon together prior to transportation to the location of use, while enabling quick and easy separation for use when needed. In some embodiments, the anchor ribbon 100, 400, 700, 1000, 1400 retaining cap 200, 500, 800, 1100, 1500 and the breakaway member may be manufactured as a single piece.

It should be noted that anchor ribbon 100, 400, 700, 1000, 1400 is not limited to comprising at least one integrated gear rack. Rather, anchor ribbon 100, 400, 700, 1000, 1400 could comprise alternative means for engaging a pawl, such as a plurality of ratchet teeth, or a ladder-type construction, without departing from the spirit of the present invention.

It should be noted that retaining cap 200, 500, 800, 1100, 1500 may be cylindrical, conical, rectangular, or alternatively shaped. Further, retaining cap 200, 500, 800, 1100, 1500 is not limited to comprising a pawl 220, 520, 820, 1120, 1520 for engaging integrated gear rack 120, 420, 720, 1020, 1420. Rather, retaining cap 200, 500, 800, 1100, 1500 could comprise alternative means for engaging integrated gear rack 120, 420, 720, 1020, 1420 such as a fixed angular projection or a conventional locking tang designed to engage a ladder-type strap, without departing from the spirit of the present invention.

It should be noted that anchor ribbon 100, 400, 700, 1000, 1400 and retaining cap 200, 500, 800, 1100, 1500 may be formed from the same material, or different materials, without departing from the spirit of the present invention. They are preferably formed from plastic or another light material. The proportions of anchor ribbon 100, 400, 700, 1000, 1400 and retaining cap 200, 500, 800, 1100, 1500 may differ from the specific embodiments described herein. For example, anchor ribbon 100, 400, 700, 1000, 1400 may be significantly longer to accommodate thicker workpieces or a plurality of workpieces. Anchor ribbon 100, 400, 700, 1000, 1400 may be significantly shorter to limit the length of free end 140, 440, 740, 1040, 1440 protruding from the workpieces. In some embodiments, anchor ribbon 100, 400, 700, 1000, 1400 may be formed from a material such that the free end 140, 440, 740, 1040, 1440 may be easily trimmed after the retaining cap 200, 500, 800, 1100, 1500 is in place.

In the embodiments shown in FIGS. 1, 2, 6-8, 12-14, 22 & 23 the integrated gear rack 120, 420, 720, 1420 is shown as extending partway across a full width of the extended ribbon 110, 410, 710, 1420 whereby the bordering opposite vertical edges of the extended ribbon 110, 410, 710, 1410 are smooth, i.e. are substantially free of gear rack teeth. Alternatively, in any of the embodiments described and shown herein, the integrated gear rack 120, 420, 720, 1420 may extend across the full width of the extended ribbon 110, 410, 710, 1410 leaving no such vertical bordering edges. Similarly the teeth of the cooperating pawls 220, 520, 820, 1520 may also extend an entire width of the pawls 220, 520, 820, 1520 for maximum or optimal engagement with the corresponding integrated gear racks 120, 420, 720, 1420. FIGS. 19 & 20 shown an embodiment having an integrated gear rack 1020 which spans a full width of the extended ribbon 1010, as described above, and the pawl 1120 of retaining cap 1100 may extend across the full width of the extended ribbon 1010 for maximum or optimal engagement with the corresponding integrated gear rack 1020. The embodiments shown in FIGS. 19 & 20 may alternatively have an integrated gear rack which spans less than entire width of the extended ribbon 1010.

In one embodiment, the fastener of the present invention may be used for securing pipeline shield panels for protecting pipelines in buried pipeline installations. In such an embodiment, the workpieces 300, 310, 600, 610, 900, 910, 1300, 1310, 1600, 1610 of FIGS. 3, 6, 9, 12, 15, 18, 21 & 24 may be shield panels. A person of skill in the art will recognize that the fastener of the present invention may be used with any suitable workpieces 300, 310, 600, 610, 900, 910, 1300, 1310, 1600, 1610.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A fastener comprising:
an anchor ribbon comprising:
an extended ribbon comprising an integrated gear rack; and
an integral anchor comprising a pair of tapered wings bendably joined at an anchor end of the extended ribbon; and
a retaining cap forming a case housing a pawl and forming a slot sized and shaped to receive a free end of the extended ribbon distal the anchor end,
wherein:
the gear rack and pawl are configured to engage to resist retraction of the retaining cap when the extended ribbon is received in the slot;
the wings are configured to bend toward the extended ribbon to a collapsed state for passage of the anchor through an opening in a workpiece and to rebound to an expanded state following passage of the anchor through the opening to prevent retraction of the anchor through the opening;
the extended ribbon comprises a face, and the integrated gear rack is formed on the face of the extended ribbon; and
the face is a first face, the integrated gear rack is a first integrated gear rack, the extended ribbon further comprises a second face on a side of the extended ribbon opposite the first face, and a second integrated gear rack is formed on the second face of the extended ribbon.

2. The fastener of claim 1, wherein the tapered wings extend in a plane coplanar with the face of the extended ribbon.

3. The fastener of claim 1, wherein the tapered wings extend in a first plane orthogonal to a second plane of the face of the extended ribbon.

4. The fastener of claim 1, wherein the integrated gear rack extends an entire width of the extended ribbon face.

5. The fastener of claim 1, wherein the integrated gear rack extends less than an entire width of the extended ribbon face.

6. The fastener of claim 1, wherein the slot forms opposing surfaces having one or more flexible pawl teeth, and the pawl teeth are configured to engage corresponding opposing integrated gear racks.

7. The fastener of claim 1, wherein the pawl is a first pawl, the case of the retaining cap further houses a second pawl, and the second gear rack and the second pawl are configured to engage to resist retraction of the retaining cap when the extended ribbon is received in the slot.

8. The fastener of claim 7, wherein the second gear rack and the first pawl are configured to engage to resist retraction of the retaining cap when the extended ribbon is received in the slot, and the first gear rack and the second pawl are configured to engage to resist retraction of the retaining cap when the extended ribbon is received in the slot.

9. The fastener of claim 1 formed of plastic.

10. The fastener of claim 1, wherein the extended ribbon comprises a slot formed in a portion of the extended ribbon proximal the free end of the extended ribbon.

11. The fastener of claim 10, wherein the integrated gear rack extends in a first portion of the extended ribbon less than an entire length of the extended ribbon, and the slot is formed in a second portion of the extended ribbon different from the first portion.

12. The fastener of claim 1 further comprising a gusset bridging the extended ribbon proximal the anchor end and a joint of the tapered wings to reinforce the joint of the tapered wings.

13. The fastener of claim 1, wherein free end of the extended ribbon is tapered to facilitate insertion of the free end into the retaining cap slot.

14. The fastener of claim 1 in combination with the workpiece and a second workpiece in an arrangement wherein the workpiece and the second workpiece are fastened together by the fastener.

15. The fastener of claim 14, wherein the workpiece and the second workpiece are respective pipeline shield panels for protecting pipelines in buried pipeline installations.

16. A method of fastening workpieces having respective openings, the method comprising:
  providing a fastener comprising:
    a monolithic anchor ribbon comprising:
      an extended ribbon comprising an integrated gear rack; and
      an integral anchor comprising a pair of tapered wings bendably joined at an anchor end of the extended ribbon; and
    a retaining cap separable from the anchor ribbon forming a case housing a pawl and forming a slot sized and shaped to receive a free end of the extended ribbon distal the anchor end,
  wherein:
    the gear rack and pawl are configured to engage to resist retraction of the retaining cap when the extended ribbon is received in the slot; and
    the wings are configured to bend toward the extended ribbon to a collapsed state for passage of the anchor through an opening in a workpiece and to rebound to an expanded state following passage of the anchor through the opening to prevent retraction of the anchor through the opening;
  positioning the two workpieces to overlap the respective openings;
  inserting the anchor end of the extended ribbon through a near side of the overlapped openings until the tapered wings rebound on a far side of the overlapped openings opposite the near side;
  threading the free end of the extended ribbon into the slot the retaining cap; and
  moving the retaining cap and anchor together until the retaining cap and anchor sandwich the workpieces.

17. The method of claim 16, wherein the workpieces are respective pipeline shield panels for protecting pipelines in buried pipeline installations.

\* \* \* \* \*